March 7, 1939.  H. A. MASON  2,149,401
INCLINOMETER
Filed May 10, 1938
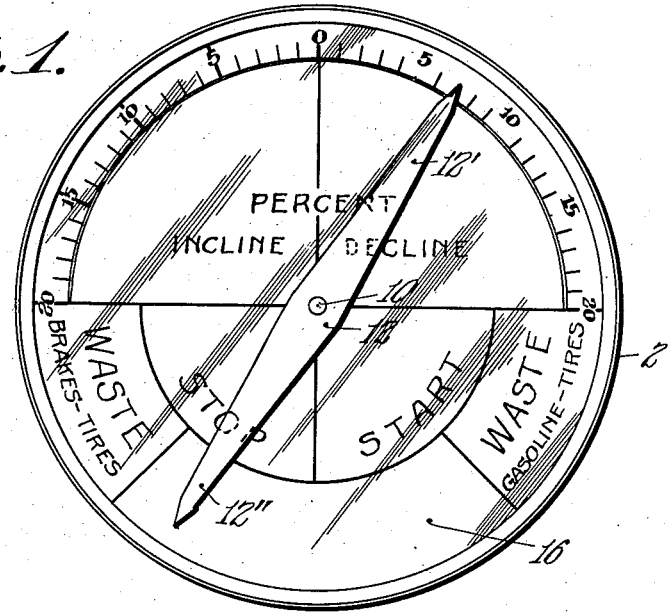
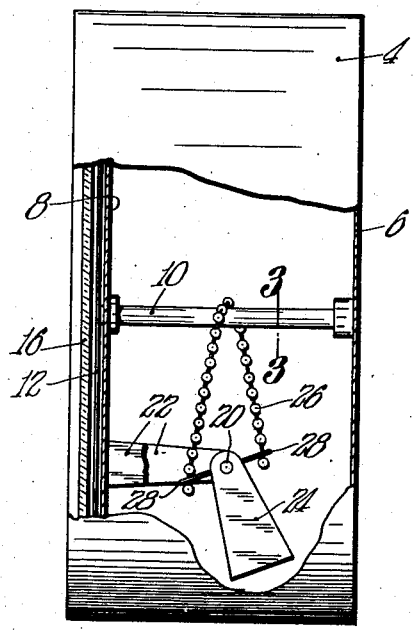
INVENTOR.
Herman A. Mason.
BY Walter C. Ross
ATTORNEY.

Patented Mar. 7, 1939

2,149,401

UNITED STATES PATENT OFFICE 2,149,401

INCLINOMETER

Herman A. Mason, Springfield, Mass.

Application May 10, 1938, Serial No. 207,120

2 Claims. (Cl. 33—215)

This invention relates to improvements in indicating devices for automobiles and the like.

The principal objects of the invention are directed to the provision of an indicating device adapted for use with motor vehicles to indicate whether the vehicle is traveling up or down grade and is operable for indicating purposes when the vehicle starts or stops suddenly.

According to special features of the invention the device is adapted to be attached to a vehicle in some convenient manner so as to indicate automatically and visually for the purposes intended. It is desirable and necessary for a number of reasons for the operator to know whether he is traveling upgrade or downgrade and to that end the device of this invention is arranged to visually impart such information.

As one special feature of the invention the device is arranged to indicate when the vehicle is being stopped or started which is desirable for the reasons that in suddenly stopping a vehicle there is not only wear and tear on the mechanism of the vehicle in general but a decided wear and strain on the brake apparatus which results in a waste of brake surfaces and impairment of the tires.

Likewise, when a vehicle is suddenly started, there is a waste of gasoline and undue and unnecessary wearing of tires. The device of the invention indicates such stopping and starting and visually warns the operator of the waste of brakes, tires, gasoline, etc.

The device of the invention is adapted for broad application, but it is to be described in connection with a motor vehicle, such as an automobile, for purposes of disclosure. The various novel features and advantages of the invention will be hereinafter more fully referred to in connection with the accompanying description of the present preferred form of the invention.

In the drawing:

Fig. 1 is a front elevational view of the indicating device of the invention;

Fig. 2 is a side elevational view of the same with parts broken away and in section for clearness; and Fig. 3 is an enlarged sectional elevational view on the line 3—3 of Fig. 2.

Referring now to the drawing more in detail the invention will be fully described.

The device of the invention may include a casing 2 of any desired form having peripheral wall 4, a rear wall 6, and a wall 8 which carries indicia to provide a dial, as will hereinafter appear.

As stated, the casing may take any desired form and the device may be secured to a motor vehicle in any convenient manner so that the dial thereof will be visible to the operator.

A shaft 10 for a pointer 12 is journalled for oscillatory or rotative movements in the dial and rear wall 6 as shown. The pointer has upper and lower ends 12' and 12".

Normally the upper end 12 of the pointer is in register with the zero shown on the dial in Fig. 1, that is, when the vehicle stands still on a level roadway or is traveling along on a level roadway the upper end 12' of the pointer registers with the zero.

However, when the vehicle is on an incline, or on a decline, the pointer will swing to the right or left so that the pointer end 12' traverses the indicia to the right and left of the zero.

The indicia may include characters and lines of various styles or kinds to indicate the incline or decline in percentages, angles, feet per unit of length or whatever may be desired. It is the intention that such indicia will be employed in cooperation with the pointer to indicate and advise the operator whether the vehicle is traveling up or down grade.

The lower part of the dial includes the words "Stop" and "Start" and there appears adjacent thereto the words "Waste, brakes, tires", "Waste, gasoline, tires".

When the vehicle is suddenly stopped or suddenly started the pointer end 12" moves relative to the lower part of the dial to warn and call the attention of the operator to the waste which inevitably takes place under such circumstances. Not only is the operator likely to take notice of the fact that such stopping and starting brings about waste, but he naturally becomes sensible of the fact that such sudden stopping and starting is not only injurious to the mechanism but that it is dangerous to vehicles in the front and the rear of the operator's vehicle.

The shaft is operated by means of the following:

A shaft 20 is rotatable or oscillatable in bracket 22 or the like and it carries a weight 24 depending downwardly therefrom. The axis of shaft 20 is opposed to the axis of shaft 10 as by being disposed transversely thereto. The device is carried by the vehicle in such a way that the weight is swung thereby which causes shaft 20 to rotate or oscillate accordingly as the vehicle is tilted in one direction or the other. With the weight in the normal vertical position as when the vehicle is traveling on a level roadway should the vehicle be suddenly stopped the weight will be swinging in one direction. If the vehicle is started suddenly the weight will be swung in an opposite direction.

Any movement of the weight such as caused by stopping or starting of the vehicle or by reason of the vehicle traveling down a declining roadway or up an inclining roadway rotates or oscillates shaft 20 which movement is imparted to the pointer.

The shaft 20 and shaft 10 are connected in some suitable manner as by a flexible member 26. In the preferred form this consists of a link or bead chain which has its opposite ends engaged in loops 28 associated with the shaft 20 and weight. Its intermediate portion extends around the shaft 10 and it is tied thereto as by a pin 30 which may be associated with the shaft 10 and extend through one of the sections of the beads of the chain as shown in Fig. 3.

Thus the weight swings back and forth on its axis to oscillate shaft 10 on its axis opposed thereto or disposed transversely relative thereto.

If desired, there may be a quantity of liquid within the casing to facilitate the smooth working and the efficient and delicate steadying of the mechanism. Of course, oil would be most suitable.

While I have described the invention in great detail and with respect to the present preferred form thereof, it is not desired to be limited thereto since many changes and modifications may be made therein without departing from the spirit and scope of the invention.

What it is desired to claim and secure by Letters Patent of the United States is:

1. In a device of the character described, a casing having spaced front and rear wall members, a rotatable pointer shaft having its opposite ends journalled in said wall members, a bracket disposed below said shaft and extending from one wall member towards the other, a weight pivoted to said bracket on an axis which is transverse to the axis of said pointer shaft for swinging back and forth below the pointer shaft in planes which are parallel to the longitudinal axis of the pointer shaft, a flexible member having an intermediate portion looped over said pointer shaft and end portions depending downwardly therefrom, connections between the weight and said end portions at opposite sides of the pivotal axis of the weight, and means associated with said pointer shaft fixing the looped portion of the flexible member relative to the pointer shaft, all adapted and arranged whereby movement of said weight towards the rear wall member moves one of said connections downwardly to cause rotation of the pointer shaft in one direction while movement of said weight towards the front wall member moves the other of said connections downwardly to cause rotation of the pointer shaft in an opposite direction.

2. In a device of the character described, a casing having spaced front and rear wall members, a rotatable pointer shaft having its opposite ends journalled in said wall members, a bracket disposed below said shaft and extending from one wall member towards the other, a weight pivoted to said bracket on an axis which is transverse to the axis of said pointer shaft for swinging back and forth below the pointer shaft in planes which are parallel to the longitudinal axis of the pointer shaft, a flexible chain member having an intermediate portion looped over said pointer shaft and end portions depending downwardly therefrom, connections between the weight and said end portions at opposite sides of the pivotal axis of the weight, and a projection extending outwardly from said pointer shaft and engaging a link of the looped portion of the chance member so as to fix the same relative to the pointer shaft, all adapted and arranged whereby movement of said weight towards the rear wall member moves one of said connections downwardly to cause rotation of the pointer shaft in one direction while movement of said weight towards the front wall member moves the other of said connections downwardly to cause rotation of the pointer shaft in an opposite direction.

HERMAN A. MASON.